(12) United States Patent
Buxton (10) Patent No.: US 8,879,887 B2
(45) Date of Patent: Nov. 4, 2014

(54) EMPLOYING ARTIFACTS FOR VIDEO INDEXING

(75) Inventor: William A. S. Buxton, Toronto (CA)

(73) Assignee: Microsoft Corporation, Redmond, WA (US)

(*) Notice: Subject to any disclaimer, the term of this patent is extended or adjusted under 35 U.S.C. 154(b) by 856 days.

(21) Appl. No.: 12/487,588

(22) Filed: Jun. 18, 2009

(65) Prior Publication Data

US 2010/0322593 A1 Dec. 23, 2010

(51) Int. Cl.
| | |
|---|---|
| H04N 9/80 | (2006.01) |
| G06F 17/30 | (2006.01) |
| H04N 5/76 | (2006.01) |
| G11B 27/28 | (2006.01) |
| H04N 9/82 | (2006.01) |
| H04N 5/91 | (2006.01) |
| H04N 5/765 | (2006.01) |

(52) U.S. Cl.
CPC ............. *H04N 5/76* (2013.01); *G06F 17/3079* (2013.01); *H04N 9/8205* (2013.01); *H04N 5/91* (2013.01); *G06F 17/30831* (2013.01); *H04N 5/765* (2013.01); *G11B 27/28* (2013.01)
USPC .......................................................... 386/241

(58) Field of Classification Search
CPC ......... G06F 17/3079; H04N 5/00; H04N 5/76
See application file for complete search history.

(56) References Cited

U.S. PATENT DOCUMENTS

2008/0080743 A1* 4/2008 Schneiderman et al. ..... 382/118

* cited by examiner

*Primary Examiner* — Huy T Nguyen
(74) *Attorney, Agent, or Firm* — Dan Choi; Judy Yee; Micky Minhas (57) ABSTRACT

One or more embodiments disclosed herein provide methods and systems for indexing video recordings of scenes using artifacts. More specifically one or more embodiments provide methods which identify artifacts in video recordings and index the video recordings according to the artifacts. These methods and systems also output portions of the video recordings according to the artifact-based indexing.

20 Claims, 8 Drawing Sheets

EMPLOYING ARTIFACTS FOR VIDEO INDEXING

BACKGROUND

People often videotape or otherwise record meetings, conferences, corporate events, ceremonies, and other scenes to capture the activities and events occurring in the scenes and information generated therein. For instance, some businesses memorialize (by way of video recording, audio recording, or a combination thereof) meetings convened to discuss some issue(s) of interest to the participants. The participants and others can, as desired, peruse the video recording of the scene to refresh their memories, to clarify some point regarding the issue, to learn what transpired during certain portions of the scene, etc.

While having the recording available is certainly better than having no (or an incomplete) record of the scene, users often grow frustrated as they search for some desired portion of the video recording. At times, users find it necessary to watch or fast-forward through the entire video recording to locate and watch some relatively small portion of the same. Sometimes the user can remember (or know of) certain events occurring during portions of the video recording which they wish to view. Still, even with this knowledge, the user must skim through potentially lengthy portions of the video recording to spot the event and, having spotted the event, hunt around that event for the portion of the video recording which they desire to view.

SUMMARY

One or more embodiments disclosed herein provide methods and systems for indexing video recordings of scenes using artifacts. More specifically, one or more embodiments provide identification of artifacts in video recordings and index the video recordings according to the artifacts. In addition, output portions of the video recordings may be based according to artifact-based indexing.

Furthermore, techniques and technologies are disclosed herein for indexing a video recording of a scene and outputting a portion of the video recording according to an artifact-based index. Such techniques and technologies allow a video recording of a scene to be indexed according to artifacts identified in the video recording. Moreover, some of the techniques and technologies output a portion of the video recording according to the artifact-based indexing.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "tools," for instance, may refer to system(s), method(s), computer-readable instructions, and/or technique(s) as permitted by the context above and throughout the document.

BRIEF DESCRIPTION OF THE CONTENTS

The detailed description is described with reference to accompanying figures. In the figures, the left-most digit(s) of a reference number identifies the figure in which the reference number first appears. The use of the same reference numbers in different figures indicates similar or identical items.

DETAILED DESCRIPTION

This document describes tools for indexing video recordings of scenes using artifacts. Moreover, the tools described herein allow for efficiently and accurately indexing certain types of scenes which traditional indexing techniques can not index. Furthermore, this application discloses methods, systems, apparatus, etc. for indexing a video recording of a scene (using artifacts of objects in the scene) for facilitating searches for desired portions of the video recording.

A method of some embodiments includes accepting an input indicative of an object in the scene. In these embodiments, the scene was substantially static (as is further disclosed herein) during the time the video recording was recorded. Responsive to the input, the method also includes identifying an artifact of the object in the video recording. Following the identification of the artifact, the method includes searching the video recording for a change associated with the identified artifact. Additionally, the method outputs a portion of the video recording from about the time that the change associated with the artifact occurred.

In some embodiments the video recording is indexed according to the various changes which occurred to the appearance of the object during the recording of the scene. Moreover, the input can also indicate the type of changes so that the video recording is searched for that type of change. For instance, the indicated change can be speaker moving to a new position in the scene. Moreover, the method can include accepting a selection of a level of significance associated with the change so that the searching of the video recording is for changes greater than the selected level (or within a range).

Furthermore, in some embodiments, the method includes (before the input is accepted) additional activities. For instance, a plurality of artifacts corresponding to a plurality of objects can be identified. The video recording is searched for and indexed according to these changes to these artifacts in some embodiments.

Additionally, or in the alternative, another input indicative of a change to an electronic file (which occurred on a computer in the scene and during the recording of the scene) is accepted. The method then outputs another portion of the video recording which is from about the time that the change to the electronic file occurred). Moreover, the application discloses computer readable storage media which store computer readable instructions for performing methods similar to the foregoing. Likewise, the application discloses systems for performing methods similar to the forgoing. These systems include a computer with a processor for performing such methods; a user input device for accepting the input(s); a display for displaying the outputs; and a memory for storing the video recordings and the computer readable instructions.

Further still, this application discloses systems of some particular embodiments which include a laptop computer with a processor, a user input device, a display, and a memory. The laptop computer is configured for searching a video recording of a scene for a portion of the video recording. In the current embodiment, the memory stores the video recording of a scene and an electronic document. Some of the methods performed by these systems include searching the video recording of the scene for a change associated with the artifact of the object in the scene. The system then outputs, on the display, a portion of the video recording from about the time that the change associated with the artifact occurred.

Additionally, the systems of the current embodiment accept another input indicative of a change to the electronic file which occurred during the recording of the scene. These systems then output on the display another portion of the video recording from about the time that the change to the electronic file occurred.

Having disclosed certain embodiments at a general level, this application next discloses various aspects of scenes including (but not limited to) certain events, activities, and objects of the scenes. This application further discloses some differences between video recordings of substantially static scenes and video recordings of other scenes. In the contexts of video recording, this application next discloses various aspects of artifacts. This application discloses various embodiments of artifact-based video indexing systems and methods.

Figure 1:
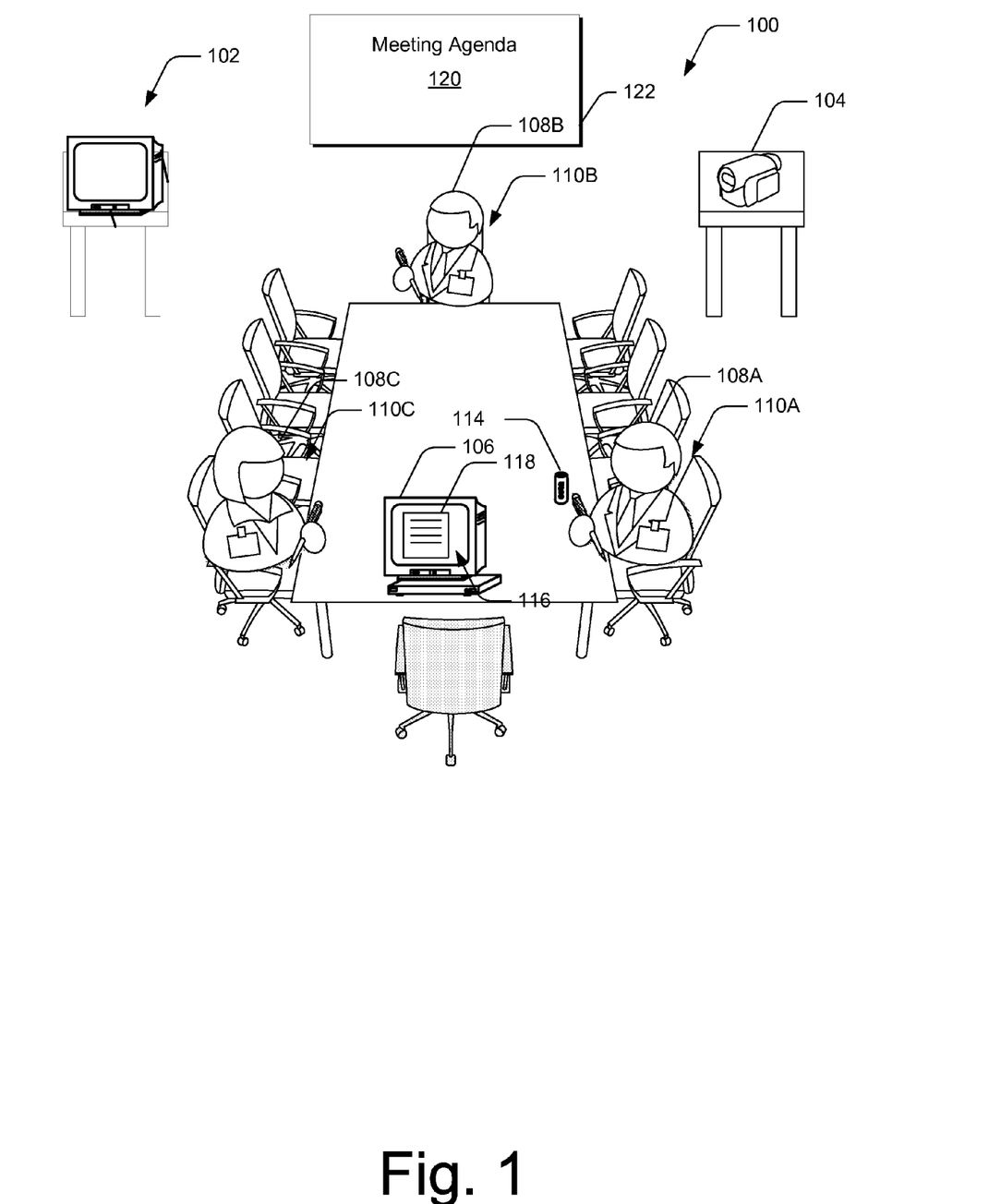
FIG. 1 depicts an illustrative scene including certain events, activities, objects, and a video indexing system.

With reference now to FIG. 1, the drawing illustrates a scene including an embodiment of a system for indexing a video recording. FIG. 1 illustrates a scene 100, a video indexing system 102, a video recording subsystem 104, a computing subsystem 106, several participants 108A, 108B, 108C, their respective personal spaces 110A, 110B, and 110C, a beverage container 114, a work space 116 and an electronic document 108 on the computing subsystem 106, and various other objects 120 such as a whiteboard 122. As discussed previously, certain users might wish to record the events and activities occurring within the scene 100 to memorialize the same. For instance, the illustrated scene 100 is a business conference, although many other types of scenes 100 are possible (and will be further elaborated upon herein). Thus, the video indexing system 102 can include the video recording subsystem 104 generally focused on the scene 100. Moreover, the computing subsystem 106 provides a particular participant 108 (and other users) the ability to perform certain electronic functions (such as working on electronic documents) during the recording of the scene 100 and to access the video recording of the scene 100 as may be desired. For accessing the video recordings, the computing subsystem 106 need not be present in the scene 100.

In addition, FIG. 1 illustrates that each participant 108A, 108B, and 108C has associated therewith their respective personal space 110A, 110B, and 110C. Actions associated with a particular participant 108A, 108B, and 108C characterize and define their respective personal space 110A, 110B, and 110C. These actions involve the particular participant manipulating certain objects 120 (a refreshment such as beverage container 114 illustrating one particular type of object 120) within the scene 100. Of course, the manipulated object 120 could be the particular participant him/herself such as when the particular participant 108 moves. These actions associated with the personal space 110 of the particular participant 108 often have little, if anything, to do with the underlying issue for which the scene 100 was convened and/or recorded.

On the other hand, particular participants 108 often carry a computing subsystem 106 (e.g., a laptop computer) which they use for purposes related to the issue for which the scene 100 was convened and/or recorded. In the case where the computing subsystem 106 is a laptop computer, the participant 108A, 108B, and 108C might find it convenient to take notes, re-write documents (in whole or in part), manipulate information, access information, display information or otherwise alter some electronic file as events and activities occur during the scene 100. More particularly, the computing subsystem 106 of the current embodiment defines a work space 116 in which the particular participant manipulates electronic files 118 as the scene develops.

Moreover, as the scene 100 unfolds, the participants 108A, 108B, and 108C are likely to be discussing certain issues, developing certain documents, drawing on whiteboards, etc. in collaborative or individual manners. Often, the motivation for setting up the video recording system 102 includes capturing the inception, development, and products of these collaborative and individual efforts. Thus, after the scene 100 ends, a participant of participants 108A, 108B, and 108C might wish to view a particular portion of the video recording of the scene 100 during which some point in the foregoing efforts was reached. Due to the nature of human memory, though, the participant might not be able to remember when that point in the discussion was reached. However, the participant might be able to remember that it occurred more or less simultaneously (or before or after) with some event or activity during the scene 100. In the alternative, or in addition, a user might have been told that such was the case.

Here it is noted that the terms "event" and "activity" each involve a change in or associated with an object 120 in the scene 100. For instance, while the scene 100 unfolds, certain participants might draw or write on a particular object 120 which happens to be a white board in the illustrative scene 100 of FIG. 1. Objects 120 are not limited to whiteboards 122 of course. Objects 120 include furniture, the participants 108 themselves, beverage containers, the door to a room, and any other objects whose appearance (and changes thereto) can be captured by video recording subsystem 104.

As further illustrated by FIG. 1, various activities and events can cause the appearance of an object 120 to change. For instance, participant 108A might pick up, throw away, or otherwise move the beverage container 114. Participant 108B might enter the room wherein the scene 100 is occurring thereby changing his/her own appearance within the video recording. Hence, the entrance of the participant 108B into the room might signal an event such as the beginning of a new discussion while the discussion itself might be considered an activity. The participants 108A, 108B, and 108C might associate these object-appearance-changing-events and activities with portions of the scene 100 which they wish to review via the video recording of the scene 100. Embodiments disclosed herein provide systems, methods, apparatus, etc. which reflect how humans recall such memories in everyday life (and otherwise). For instance, one of the participants 108A might recall that some portion of interest of the scene 100 occurred "just before Sally got up and got a soda." By indexing video recordings according to such information, embodiments allow users to locate portions of video recordings in an intuitive, user-friendly manner.

One aspect of the systems, methods, apparatus, etc. disclosed herein includes indexing the video recording of the scene 100 according to the changes in appearance of various objects (such as beverage container 114) in the scene 100. Using such indexes, the systems, methods, apparatus, etc. described herein allow portions of the video recording of the scene 100 to be rapidly identified for viewing by the participants 108 (and/or other users). Having discussed certain aspects of the scene 100 of FIG. 1, it may now be useful to further elaborate on the types of scenes 100 for which the video indexing system 102 can be used to index video recordings.

Figure 2:
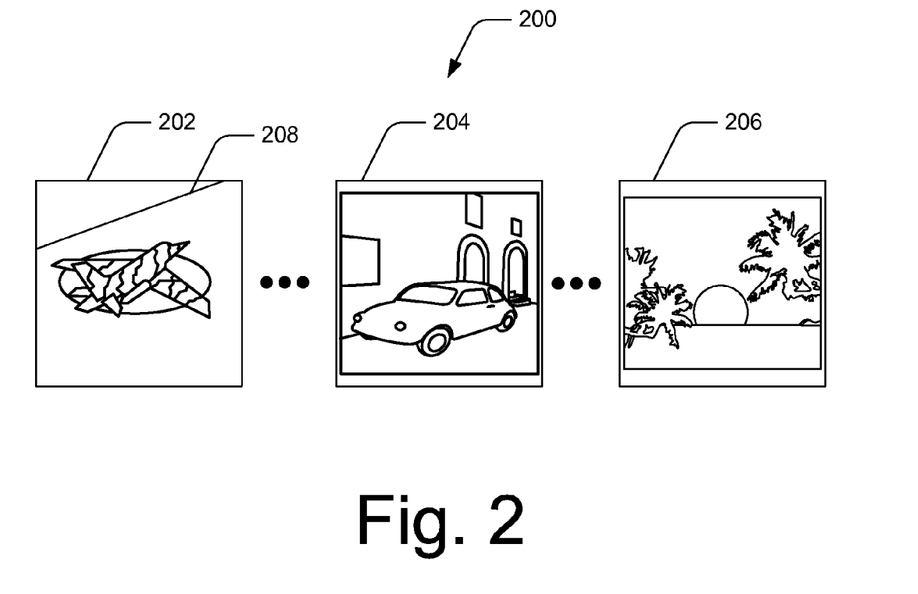
FIG. 2 depicts an illustrative video recording of several scenes including certain events, activities, objects, and a video indexing system.

With reference now to FIG. 2, and by way of contrast with scene 100 (i.e., the conference room illustrated in FIG. 1), a video recording 200 of a particular scene is depicted. More particularly, FIG. 2 illustrates three illustrative frames 202, 204, and 206 of the particular video recording 200. Of course many more frames than three, or even less, could be included in the video recording 200. In any case, frames 202, 204, and 206 illustrate that some video recordings 200 are characterized by overall changes in the scenes recorded therein. More specifically, at a general level, the scenes change abruptly between frames 202, 204, and 206. Some of these abrupt or overall changes in the scene involve camera angle changes. For instance, frame 202 illustrates, when compared to frames 204 and 206, that the camera which recorded the frame 202 was tilted at an angle with respect to the horizontal as evidenced by the non horizontal horizon 208 in the frame 202. Some of these changes involve light level changes. Other changes can involve bulk changes to the background or subject matter of the scenes recorded in video recording 200.

As illustrated, each of the three frames 202, 204, and 206 involve different underlying backgrounds and/or subject matter. More specifically, the frames 202, 204, and 206 depict an aircraft, a motor vehicle, and a nature scene, respectively. Thus, even though the frames 202, 204, and 206 have been included in a particular video recording 200, the frames involve disparate subject matter with disparate video related characteristics.

However, a number of frames involving similar subject matter could be, and indeed likely would be, adjacent to any of these particular frames 202, 204, and 206. Thus, some portions of video recording 200 could exhibit a high degree of frame-to-frame coherency. Video indexing system 102 (see FIG. 1) determines the frame-to-frame coherence between any two adjacent frames 202, 204, or 206 by correlating pixels in one frame 202, 204, or 206 with pixels in an adjacent (or other) frame 202, 204, or 206. The characteristics of the pixels involved include brightness, luma, hue, chroma, saturation, etc. In some embodiments, the video indexing system 102 uses vector graphic or other image processing techniques to correlate the frames 202, 204, and 206 by determining the frame-to-frame coherence of the video recording 200. Of course, combinations of these types of correlation techniques can be used without departing from the scope of the disclosure.

Having determined the frame-to-frame coherence of the video recording 200, the video indexing system 102 can determine when relatively large changes occur between any two frames 202, 204, or 206 (or over the course of several or more frames 202, 204, and 206). The degree of change in the frame-to-frame coherence sufficient to indicate a scene change in the video recording 200 can be user selected, statistically determined, or determined empirically by observing such frame-to-frame coherence changes across known scene changes. In any case, the video indexing system of some embodiments examines the video recording 200 and indexes scene changes where the frame-to-frame coherence changes by about an appropriate amount or more. Thus, whether the video recording 200 includes many scene changes (as some movies, television shows, etc. include) or one relatively static scene (such as the scene 100 of FIG. 1) video indexing system 102 indexes the video recording 200 for scene changes and other substantial changes in which the frame-to-frame coherence changes by more than some threshold amount.

Figure 3:
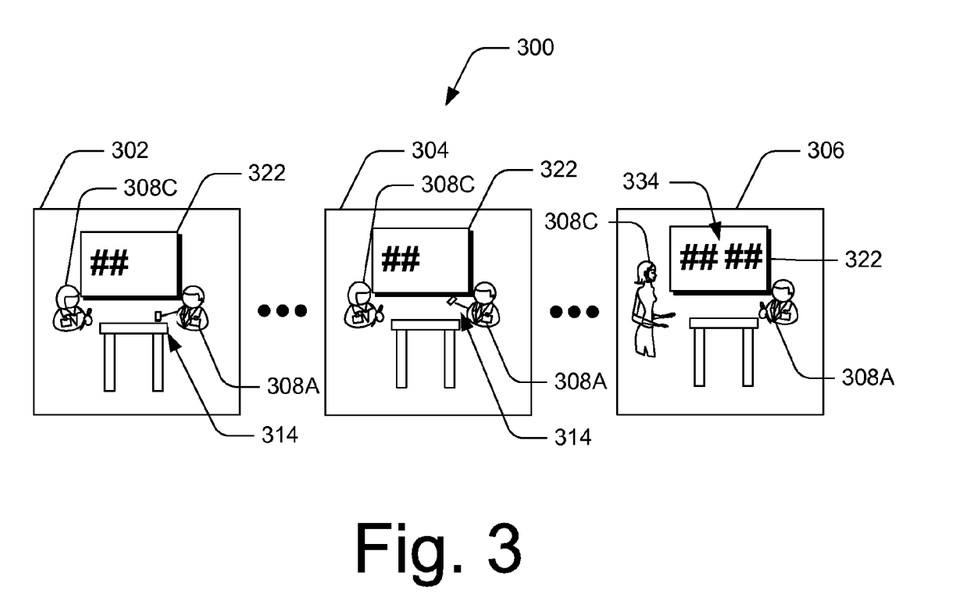
FIG. 3 depicts an illustrative video recording of another scene including certain events, activities, objects, and a video indexing system.

FIG. 3 illustrates some differences between a video recording 300 of a substantially static scene and the more dynamic video recording 200. More particularly, FIG. 3 illustrates three frames 302, 304, and 306 of the video recording 300 of the scene 100 of FIG. 1. FIG. 3 illustrates that as the video recording 300 of the scene 100 (see FIG. 1) was recorded, several illustrative activities occurred. One of these activities involved participant 108C moving to the white board 122 while another illustrative activity involved participant 108A throwing away the beverage container 114.

A comparison of the artifacts in frames 304 and 306 reveals that participant 108C (i.e., artifact 308C) was seated in a chair in frame 304 and moved to the whiteboard 122 (i.e., artifact 322) by the time that frame 306 was recorded. Of course, all of the real-world objects in the scene 100 are represented by recorded artifacts (illustrative artifacts include artifacts 308A, 308C, 314, 330, and 334) in the video recording 300 and its frames 302, 304, and 306. Artifacts, therefore, appear in the video recording 300 and reflect the changing appearance of real-world objects as the scene 100 was recorded. Herein, when real world objects 120 are being referred to, reference numbers from FIG. 1 (i.e., 100 series reference numbers) are generally used. Moreover, when artifacts corresponding to those objects are being referred to, reference numbers from FIGS. 2-4 (i.e., 200, 300, and 400 series reference number) are generally used. Thus, a particular participant 108B might move causing the corresponding artifact 308B to change.

During the illustrative move of participant 108C to the whiteboard 122 the appearance of several objects (and therefore their artifacts) changed within the scene 100. For instance, participant 108C (i.e., artifact 308C) stood up, probably pushed his or her chair back (likely causing it to translate to/from the camera, translate laterally relative to the camera, and/or to rotate or swivel). Participant 108C also walked to the whiteboard 122 passing between the table and the whiteboard 122 while perhaps gesticulating and/or handling various objects (for instance picking up an erasure or marker from the tray of the whiteboard 122). Moreover, as participant 108C moved, he or she (in whole or in part) eclipsed some objects while being eclipsed by others.

Similarly, although perhaps not as dramatically, as participant 108A threw away the beverage container 114 (i.e., artifact 314), the appearance of other objects changed. For instance, in frame 302 participant 108A (i.e., artifact 308A) held his or her arm out nearly straight to reach for the beverage container 114. Then, in frame 304, participant 108A bent his or her arm while causing the beverage container 114 to tilt or rotate relative to the horizontal. Of course, participant 108A also grasped the beverage container 114 thereby partially eclipsing the beverage container 114 (and vice versa).

Moreover, at some time between frames 304 and 306 additional information appeared on the right side of whiteboard 122 (i.e., artifact 322) as indicated by artifact 334. Furthermore, artifact 334 illustrates another aspect of the differences between artifacts and objects. An artifact (such as more information artifact 334) can appear in a video recording 300 while having no, or an insubstantial, physical object associated therewith. Here, the object associated with the more information artifact 334 is a film left on whiteboard 122. Furthermore, it is possible that some artifacts recorded in a particular video recording 300 might have no tangible object associated therewith. For instance, had whiteboard 122 been some electronic image display device (such as a CRT, LCD, or other type of display), the projected image could, once recorded, produce an artifact in video recording 300 even though no object per se was present in the recorded scene 100. For instance, the appearance of a participant on a teleconferencing display could be considered a change to an artifact in the video recording 300. Likewise, the appearance of documents 118 on the display of subsystem 106 could produce artifacts in the video recording 300.

With continuing reference to FIG. 3, human participants and other users often remember (or know or believe) that some activity or event occurred at about the time that some portion of the scene 100 was recorded. For instance, a particular user might have information that suggests that a particular issue or subject was discussed about the time that the participant 108C moved to the whiteboard 122. In the alternative, or in addition, another user might believe that some idea was discussed at about the time that participant 108A threw away the beverage container 114. Thus, searching the video recording 300 for changes to the artifacts 308C or 314 respectively of participant 108C or the beverage container 114 will possibly reveal that portion of the video recording 300 where the desired information can be reviewed.

Figure 4:
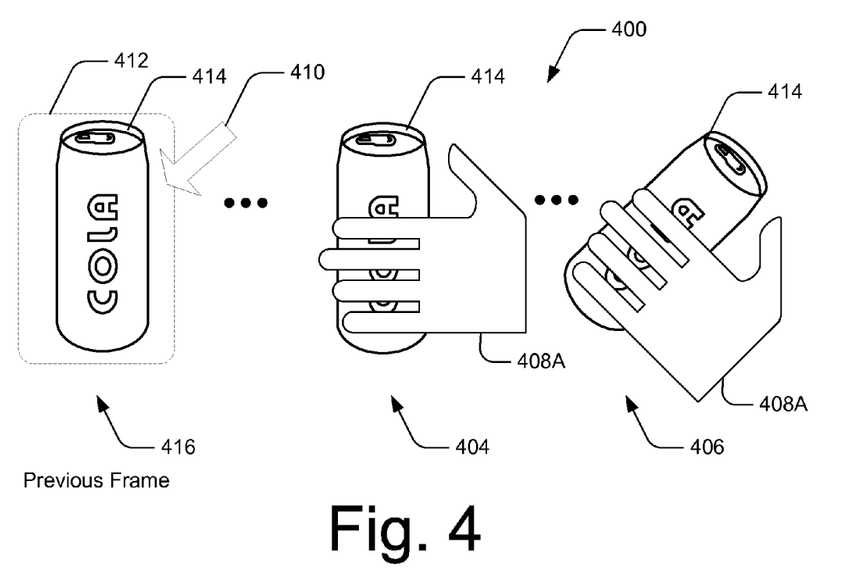
FIG. 4 depicts an illustrative artifact of an object in a video recording.

FIG. 4 depicts an illustrative artifact in a video recording and changes thereto as the video recording moves between its various frames. More particularly, FIG. 4 illustrates an artifact 414 of the beverage container 114 as video recording 400 progresses. For instance, FIG. 4 illustrates frames 404 and 406 as well as an earlier frame 416 (shown in FIG. 4 but not FIG. 3). In frame 416, artifact 414 reflects the appearance of the beverage container 114 (see FIG. 1) in which the beverage container 114 is upright and visible to the extent possible (i.e., un-eclipsed). At some point between frame 416 and frame 404, though, participant 108A (i.e., artifact 408) has grasped the beverage container 114 with his or her hand. Thus, in frame 404, the artifact 414 has changed reflecting the change in the appearance of the corresponding object (that is, the beverage container 114). Another change to the artifact 414 occurs between frames 404 and 406 in which the (partially eclipsed) object rotates relative to the horizontal.

Moreover, and as discussed further herein, FIG. 4 illustrates a pointer 410 and a highlighting effect 412. Briefly, in some embodiments, pointer 410 can be used to select artifacts 414, thereby initiating a search of the video recording 400 for changes to those artifacts. Such changes to the artifacts 414 indicate an activity or event affecting the object corresponding to that artifact. Accordingly, by detecting such changes to the artifacts 414 the activities and events affecting the corresponding objects can be used to index the video recording 400. Moreover, detecting such changes to the artifacts 414 in the video recording 400 enables rapid and efficient searching of that video recording 400.

Figure 5:
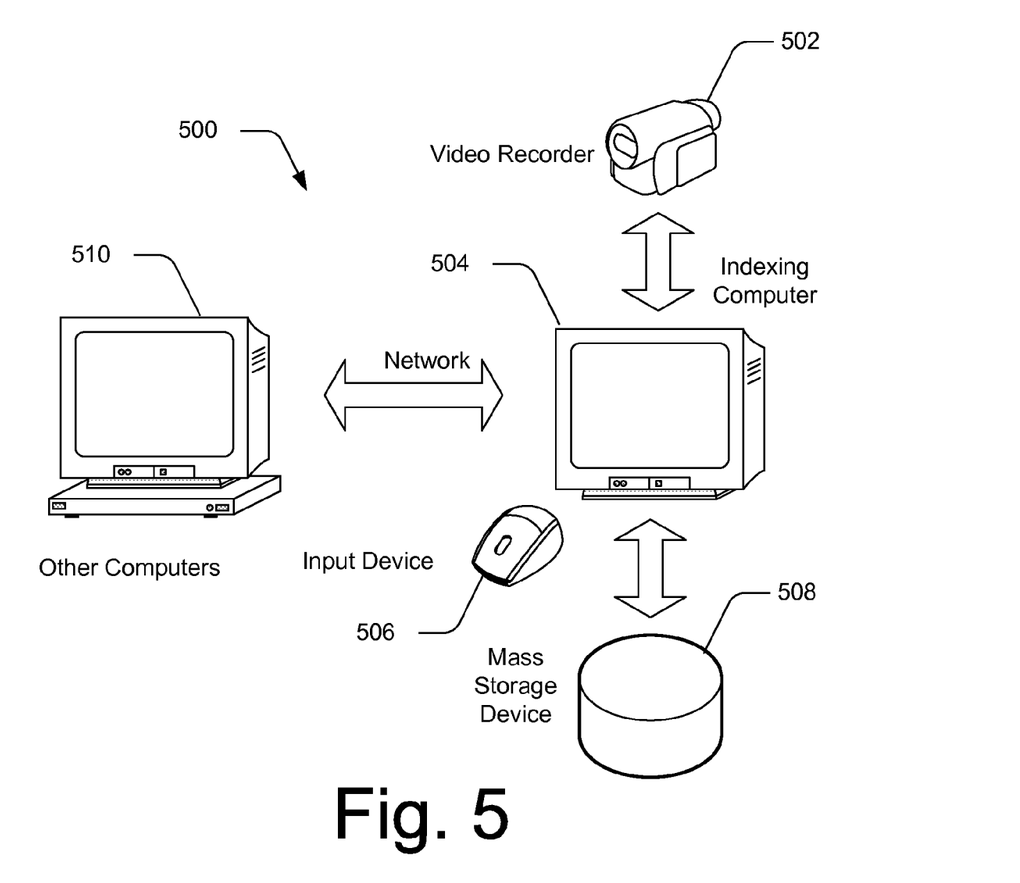
FIG. 5 depicts an illustrative block diagram of a system for indexing video recordings.

FIG. 5 depicts a block diagram of an illustrative system for indexing video recordings. The system 500 includes a video recorder 502, an indexing computer 504 including an input device 506, a mass storage device 508, and (in some embodiments) one or more computers 510. The video recorder 502, the indexing computer 504, and the mass storage device 508 are in communication with each other over a network such that video recordings recorded by the video recorder 502 can be indexed, searched, and stored by the indexing system 500.

More particularly, video recorder 502 can be any type of device capable of recording video recordings. For instance, video recorder 502 could be a camcorder, a cell phone (including a camera), a television camera, or other device. In some embodiments, the video recorder 502 is a computer with an embedded camera and which performs at least some of the functions of the indexing computer 504 (as further disclosed herein). Video recorder 502 can also include means for recording audio information of various scenes. Moreover, video recorder 502 can use digital or analog recording means without departing from the scope of the disclosure. For instance, video recorder 502 could be a camera in a video conferencing system. In any case, video recorder 502 captures sequential images of the scene which it views and stores them as frames of a video recording. Video recorder 502 can store these images locally, can transmit them to indexing computer 504, or a combination thereof.

Indexing computer 504 can be any type of computer capable of receiving the video recordings from sources such as video recorder 502, mass storage device 508, its internal memory(s), other computers 510, from a network, and many other sources too numerous for enumeration herein. Indexing computer 504 can, if desired, digitize video recordings that it receives for further processing and can also process digital video recordings. Furthermore, indexing computer 504 includes a display device on which it displays the various video recordings as desired by the user. Moreover, indexing computer 504 can receive user inputs (via for instance user input device 506). One type of input which the indexing computer 504 can accept indicates artifacts 414 within the video recording(s) 400 which the user(s) wish to use to index various video recordings 400. In some embodiments, input device 506 is a mouse although touchpads, joysticks, keyboards, and many other devices could serve as input device 506.

No matter the type of input device 506 used, indexing computer 504 determines which artifact the user has selected, searches the video recording being displayed (and/or perhaps other video recordings) for the selected artifact, and indexes the same based on changes to the selected artifact. In addition, in some embodiments, indexing computer 504 allows a user to access the portions of the video recording which include changes to the selected artifact. Thus, the user can quickly review those portions of the video recording for the change which the user believes indicates the portion of the video recording including the sought after information.

In some embodiments, the other computers 510 also communicate with the indexing computer 504. These other computers 510 can be used by participants during the recording of the scene. More particularly, such computers 510 can execute applications which allow users to make audio recordings of various scenes while working on documents and files on the computers 510. These applications record each keystroke and other user inputs as the user works on various files on the other computer 510 and indexes the audio recordings according to these user inputs. Moreover, in some embodiments, the indexing computer 504 and the other computer 510 cooperate to synchronize the audio indexing performed by the computer 510 and the video indexing being performed by the indexing computer 504.

Figure 6:
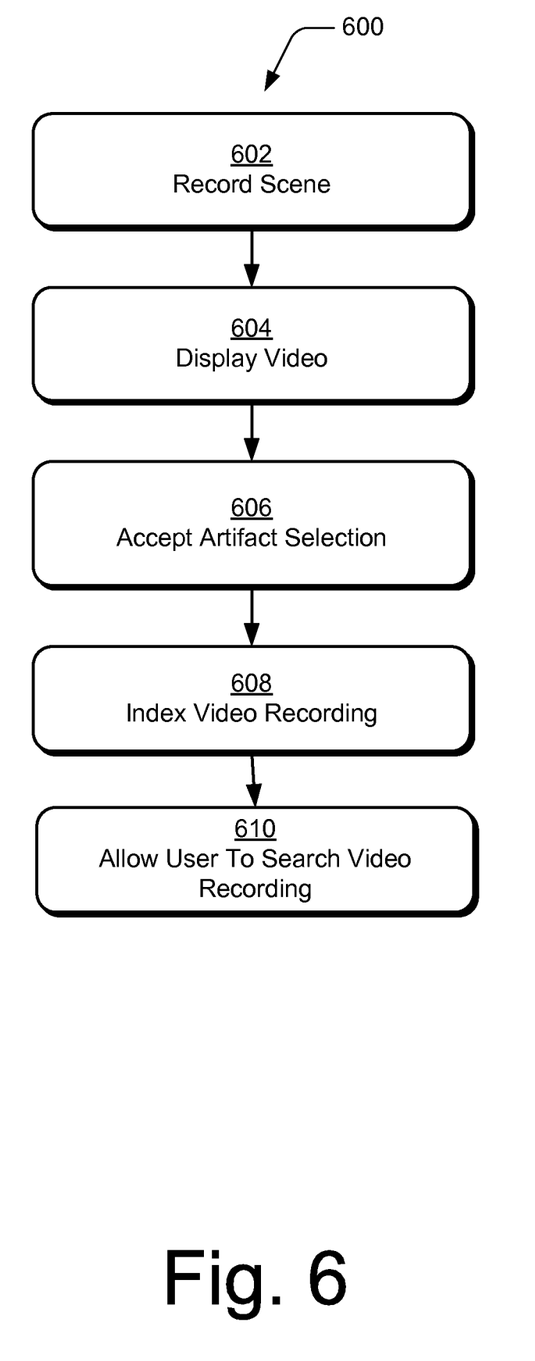
FIGS. 6-8 depict illustrative flow charts of methods related to indexing video recordings.

With reference now to FIG. 6, a method 600 related to the indexing of video recordings is illustrated. In operation, the indexing system 500 of FIG. 5 can be used to implement the method 600 of FIG. 6 as well as the methods illustrated by FIGS. 7-8. More particularly, FIG. 6 illustrates that a scene may be recorded with the video recorder 502 at step 602. Audio information from the scene may also be recorded during the video recording in step 602. Additionally, or in the alternative, information related to a user's activities with a computer 510 can also be recorded also.

At step 604 a user can select a video recording to index and/or search. Based on the user's selection the video recording can be displayed. During the display of the video recording, the user can cause the video recording to be stopped, paused, played at a slower speed, fast forwarded and could perform other time shifting techniques to enhance the user's ability to find an occurrence of the artifact which the user wishes to select. When the user finds an occurrence of the artifact, the user can select it using the input device 506 or through some other means. For instance, the user can position the pointer 410 (see FIG. 4) over or near an occurrence of an artifact 432 in the displayed video recording and select it accordingly.

Thus, the indexing system, at step 606, accepts the user's selection of a particular artifact. Depending on the form of the user's input, the system 500 can detect the location of the pointer 410 to determine which artifact 414 the user is attempting to select. However, it might be the case that the pointer 410 might be located near more than one artifact 414. It might also be the case that the user positioned the pointer 410 near artifacts 414 that overlap or in some other manner leave the user's selection ambiguous. In such situations, the system 500 can use boundary finding and/or other image processing techniques to determine which artifact 414 the user has indicated. See step 606.

Once the selected artifact 414 has been identified, the system 500 can search through the video recording 400 identifying and indexing changes to the artifact 414 which might indicate that some event or activity associated with the underlying object occurred. See step 608. With the video recording 400 indexed (or partially indexed) the system 500 can allow the user to search through the video recording 400 accessing indexed portions of the video recording 400 which are associated with the indexed change searching for the information which the user wishes to review. See step 610.

Figure 7:
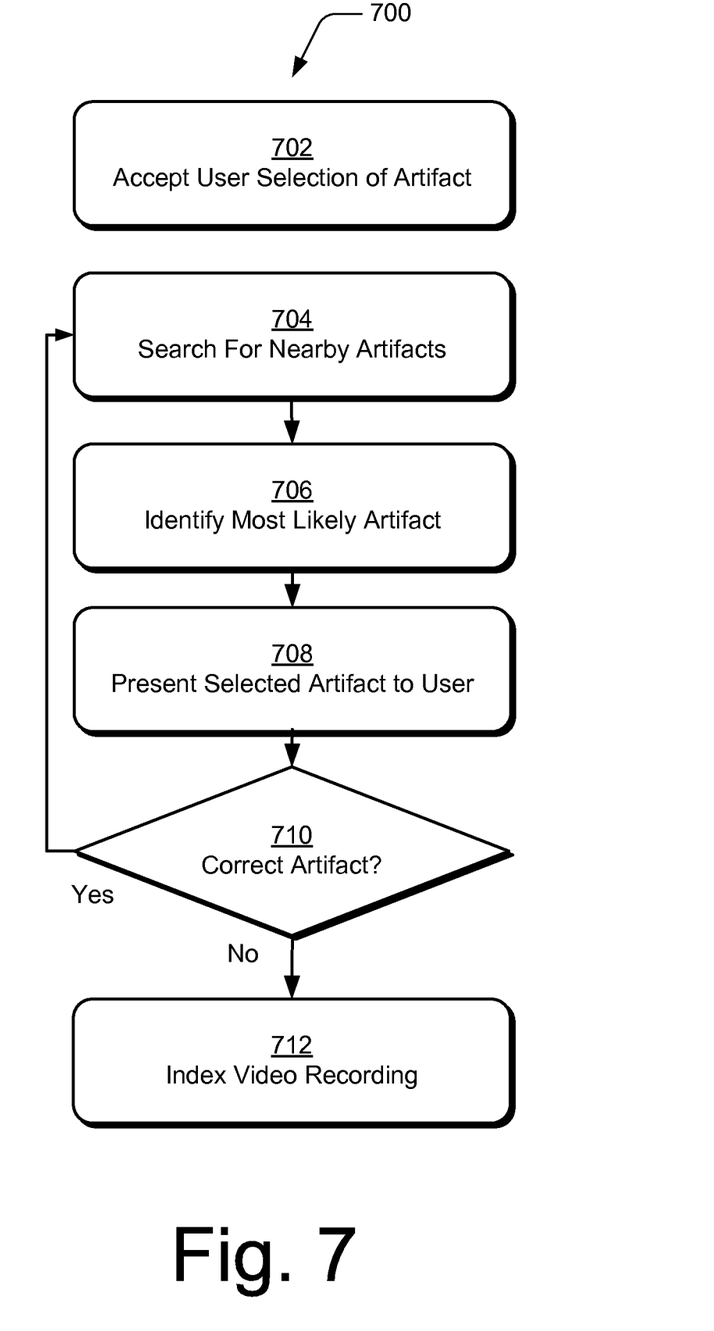

With further regard to the selection of an occurrence of an artifact 414, FIG. 7 depicts another method 700 associated with indexing video recordings. The method 700 can also be implemented using system 500 of FIG. 5 although (as with the other methods disclosed herein) other systems, apparatus, etc. could be used to implement the methods described herein. Nonetheless, method 700 includes various steps such as step 702 at which the user's attempted selection of an artifact 414 is accepted. In some embodiments, the system 500 can detect artifacts associated with certain objects within the video recording (or a particular frame), place a highlighting affect 412 on them, and accept an input from the user which indicates which one of the pre-determined artifacts the user wishes to use to index the system. The system 500 can search the frame 416 (in which the user's attempt at selecting the artifact 414 occurred) for various artifacts 414 near the pointer 410. See step 704.

Since the system 500 might return more than one artifact 414 from the foregoing search, some means for determining which artifact 414 was the most likely target can be included in the system 500. For instance, step 706 illustrates that the method 600 selects the artifact that is the mostly likely user target. For instance, the system 500 can include provisions for selecting the artifact 414 closest to the pointer 410. In the alternative, or in addition, the system 500 can be configured to select the most prominent artifact 414 (by reason of relative size, brightness, aspect ratio, duration of appearance in the video recording, etc.) in the frame 416 (or surrounding frames 404 and 406). Moreover, the system 500 can invert the factors affecting the selection of the most likely artifact 414 so that, for instance, obscure or apparently insignificant artifacts 414 can be used to index the video recording 400. Regardless of the method used to determine which artifact 414 was the one targeted by the user, the system 500 can output an indication of which artifact 414 that the system 500 determined was the intended target of the user. See step 708 at which the system 500 could generate an effect to highlight the likely target. For instance a highlighting effect 412 could be applied to the likely target. See FIG. 4 in which the identification of the likely target by system 500 is illustrated by highlighting effect 412.

With continuing reference to FIG. 7, at step 710, the system 500 can prompt the user to verify that the highlighted artifact 414 is indeed the intended target. If the user indicates that the highlighting effect 412 indicates some artifact 414 other than the target artifact 414, the system 500 can present another artifact 414 as the next most likely target. If, however, the user indicates that the system 500 correctly identified the target, then the system 500 can respond by indexing the video recording 400 (or some portion thereof) based on changes to the target. See step 712.

Figure 8:
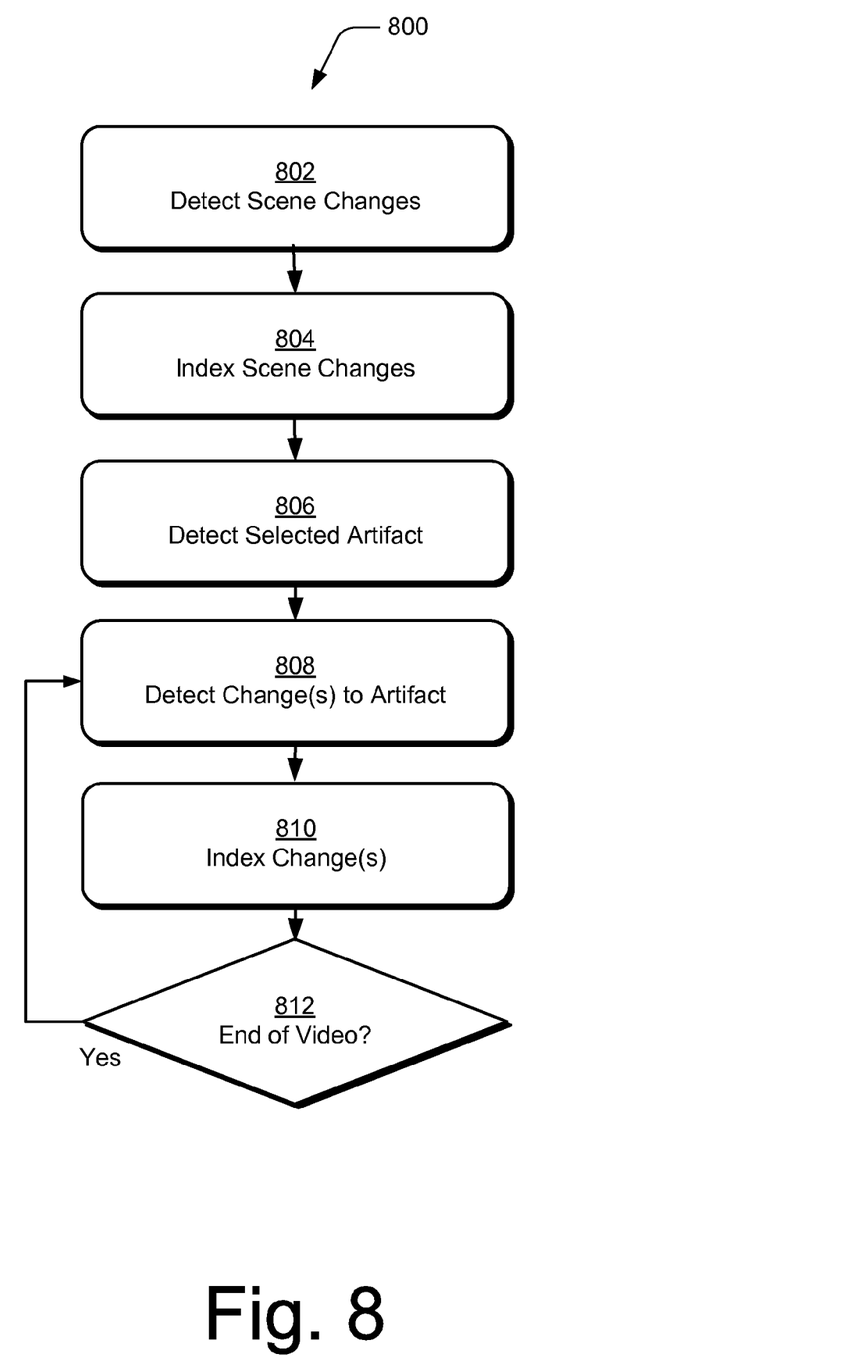

FIG. 8 depicts a flowchart of yet another method 800 related to indexing video recordings. The method 800 includes various steps such as step 802 at which the system 500 searches the video recording for overall scene changes. As disclosed elsewhere herein, it may be the case that at one or more locations (i.e., times) in the video recording 400 an overall change to the recorded scene 100 occurred. For instance, the video recorder 502 may have been paused, stopped, moved, etc. or combinations thereof during the scene(s) 100 recorded in the video recording 400. Thus, at a general level it might be useful to index (see step 804) the video recording 400 based on these overall changes. Moreover, as disclosed elsewhere herein, changes in frame-to-frame coherency can be used to indicate these overall scene 100 changes.

Once the overall scene changes have been indexed, or in the absence of such overall scene-change indexing, the video indexing system 500 can begin searching the video recording 400 for occurrences of the targeted artifact 414 identified via method 700 of FIG. 7. The video indexing system 500 can search the video recording 400 from the beginning, from the end, or in any order as desired by the user to detect occurrences of the targeted artifact 414. See step 806. Once at least one occurrence of the selected artifact 414 has been located, the video indexing system 500 begins searching for changes to that artifact 414. See step 808.

These changes can be compared to some user selected criteria such that only those changes meeting the criteria are indexed. For instance, the user can select a threshold which the change to the artifact 414 must rise above (or fall below) in order for an index to be inserted into the video recording 400 for that change. In other cases, the user might select a range that the change must fall within in order for the video indexing system 500 to index the change. In the alternative, or in addition, the user can select a type of change which the change to the artifact 414 must satisfy in order for the video indexing system 500 to index the change. Some illustrative change types include a change in color, a change in orientation, a change in aspect ratio, a change in brightness, the artifact being eclipsed (in part or in whole), the artifact 414 emerging from behind the artifact 414 of an eclipsing object, an overall scene change (for instance an overall scene change caused by the re-positioning of video recorder 502), etc.

In any case, the video indexing system 500 indexes the change according to the selected criteria, if any. Moreover, in some embodiments, the video indexing system 500 time stamps the change as well as indexing it. See step 810. Method 800 continues until the video recording 400 (or a selected portion thereof) has been indexed as indicated by step 812.

Figure 9:
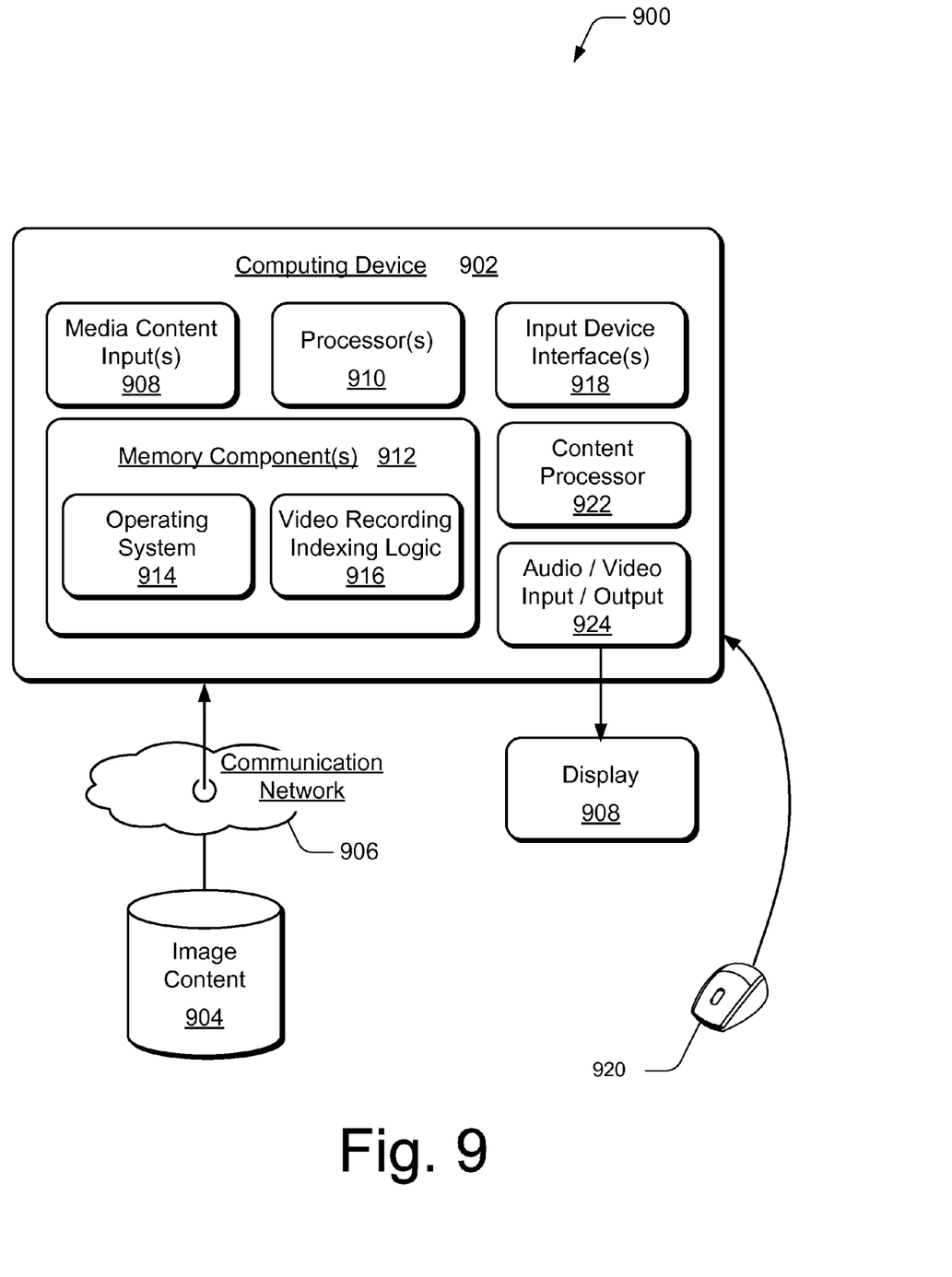
FIG. 9 depicts an illustrative block diagram of a computing system for implementing video indexing methods.

FIG. 9 illustrates various components of an exemplary computing system 900 in which a video indexing system, such as those disclosed with reference to FIGS. 1-8, can be implemented. The computing system 900 includes a computing device 902 which can be implemented in any number of embodiments with numerous other general purpose or special purpose computing system environments or configurations. Examples of well known computing systems, environments, and/or configurations that may be implemented in the exemplary computing system 900 include, but are not limited to, personal computers, hand held or laptop devices, multiprocessor systems, microprocessor-based systems, set-top boxes, programmable consumer electronics, network PCs, gaming consoles, distributed computing environments that include any of the above systems or devices, and the like.

Computing system 900 includes remote image content 904 which can be received via a communication network 906. The image content 904 is stored for display as sequential images on the display device 908 and for indexing by computing device 902. The image content 904 can include any combination of video, still images, and interpolated synthetic images captured and/or generated to form dynamic scenes for display as sequential images such as video recordings. Although the computing device 902 and the image content 904 are illustrated and described as separate and/or remote components of the computing system 900, the computing device 902 may contain the image content 904 in an internal memory component.

The computing device 902 includes one or more media content inputs 904 which may include Internet Protocol (IP) inputs over which streams of media content (e.g., image content 904) are received via an IP-based network (e.g., communication network 906). The computing device 902 also includes one or more processors 910 (e.g., any of microprocessors, controllers, and the like) which process various instructions to control the operation of computing device 902 and to communicate with other electronic and computing devices and to record, display, and index video recordings.

The computing device 902 can be implemented with one or more memory components 912, examples of which include random access memory (RAM), non-volatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), a DVD, a DVD+RW, and the like. The memory components 912 provide data storage mechanisms to store various information and/or data such as received media content, software applications, and any other types of information and data related to operational aspects of computing device 902 and to recording, displaying, and indexing video recordings.

An operating system 914 and video indexing logic 916 can be maintained as software applications in memory components 912 and executed on processor(s) 910 to implement embodiments of video indexing systems. As described above with reference FIGS. 1-8, the video indexing logic 916 generates an indexed sequential image that corresponds to the video recording 400 of a scene 100 to facilitate rapid and efficient searches of the video recording. The indexed video recording 400 includes indexes at locations (or times) at which changes occurred to a selected artifact(s) 414.

As used herein, the term "logic" (e.g., the video indexing logic 916) can also refer to hardware, firmware, software, or any combination thereof that may be implemented to perform the logical operations associated with the embodiments of video indexing systems. Logic may also include any supporting circuitry utilized to complete a given task including supportive analog operations. For example, logic may also include analog circuitry, memory components, input/output (I/O) circuitry, interface circuitry, power providing/regulating circuitry, and the like.

An input device interface 918 provides an interface for a mouse 920 that can be used to select video recordings, select artifacts within the video recordings, and to control the display of various indexed and non-indexed video recordings. Although not shown, computing device 902 may also include other input devices such as keyboards, joysticks, pointing devices, and/or other mechanisms to interact with, and to input information to computing device 902.

Computing device 902 also includes a content processor 922 which can include a video decoder and/or additional processors to receive, process, and decode media content, image content, and display data. Computing device 902 also includes audio and/or video input/outputs 924 that provides audio and/or video to an audio rendering and/or display device 908, or to other devices that process, display, and/or otherwise render audio, video, and display data.

Embodiments of video indexing systems allow users to rapidly and efficiently search video recordings for changes to the recorded scene indicative of a portion of the video recording of interest. Moreover, embodiments allow users to locate information in video recordings which the users believe might be of interest. Furthermore, embodiments provide an indexing system based on changes to artifacts in video recordings which avoid resource consuming processing such as apriori processing of the entire video recording to identify every (or many) artifact and the changes thereto.

Although embodiments of video indexing systems and methods have been disclosed in language specific to structural features and/or methods, it is to be understood that the subject of the appended claims is not necessarily limited to the specific features or methods described. Rather, the specific features and methods are disclosed as non limiting implementations of video indexing systems and methods.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system comprising:
one or more processors;
a user input device;
a display;
a memory storing a video recording of a scene and an electronic file; and
computer readable instructions maintained in the memory and executable by the one or more processors to perform acts comprising:
presenting, on the display, the video recording of the scene, wherein the scene was substantially static during a time the video recording was recorded, the video recording at least recording one or more appearance changes being made to the electronic file;
accepting a first input from the user input device selecting an object from multiple objects displayed in the video recording presented on the display, the object being selected in response to the first input positioning an indicator on or near the object as displayed in the video recording presented on the display;

responsive to the first input, identifying an artifact of the object in the video recording of the substantially static scene;

searching the video recording of the substantially static scene for an appearance change in the artifact of the object as the artifact of the object is displayed in the video recording;

outputting on the display a portion of the video recording of the substantially static scene from about a time that the appearance change in the artifact of the object occurred;

accepting a second input indicative of a change to an appearance of the electronic file as recorded in the video recording of the scene; and responsive to the second input, outputting on the display another portion of the video recording of the substantially static scene from about a time that the change to the appearance of the electronic file as recorded in the video recording occurred.

2. The system of claim 1, the acts further comprising indexing the video recording responsive to a plurality of appearance changes in the artifact of the object.

3. The system of claim 1, wherein the first input further indicates a type of the appearance change in the artifact of the object, and the searching of the video recording further comprises searching the video recording of the substantially static scene for the appearance change of the type in the artifact of the object.

4. The system of claim 3, wherein the appearance change in the artifact is a video recording participant moving to a new position in the scene.

5. The system of claim 1, the acts further comprising, before the accepting of the first input:
 identifying a plurality of artifacts corresponding to a plurality of objects in the video recording of the scene;
 searching the video recording of the substantially static scene for appearance changes in the artifacts of the objects; and
 indexing the video recording of the substantially static scene according to the appearance changes.

6. The system of claim 1, the acts further comprising accepting a selection of a level of significance associated with the appearance change in the artifact of the object, the searching of the video recording of the substantially static scene further comprising searching the video recording of the substantially static scene for an appearance change in the artifact of the object greater than the selected significance level.

7. A method comprising:
 under control of one or more processors configured with executable instructions,
 accepting an input to select an object in a video recording of a scene presented on a display, wherein the scene was substantially static when the video recording was recorded;
 responsive to the input, identifying an artifact of the object in the video recording of the substantially static scene, the artifact being identified in response to the input positioning an indicator on or near the object as displayed in the video recording presented on the display;
 searching the video recording of the substantially static scene for a change associated with the artifact of the object; and
 outputting a portion of the video recording of the substantially static scene from about a time that the change associated with the artifact of the object occurred.

8. The method as recited in claim 7, wherein:
 the accepting the input further indicates the change associated with the artifact of the object; and
 the searching of the video recording further comprises searching the video recording of the substantially static scene for the indicated change associated with the artifact of the object.

9. The method as recited in claim 8, wherein the change associated with the artifact is a video recording participant moving to a new position in the scene.

10. The method as recited in claim 7, further comprising indexing the video recording responsive to a plurality of changes associated with the artifact of the object.

11. The method as recited in claim 7, further comprising:
 accepting another input indicative of a change to an electronic file which occurred during the recording of the scene; and
 outputting another portion of the video recording of the substantially static scene from about a time that the change to the electronic file occurred.

12. The method as recited in claim 7, further comprising, before the accepting of the input:
 identifying a plurality of artifacts corresponding to a plurality of objects in the video recording of the scene;
 searching the video recording of the substantially static scene for changes associated with the artifacts of the objects; and
 indexing the video recording of the substantially static scene according to the changes.

13. The method as recited in claim 7, further comprising accepting a selection of a level of significance associated with the change associated with the artifact of the object, the searching of the video recording of the substantially static scene further comprising searching the video recording of the substantially static scene for a change associated with the artifact of the object greater than the selected significance level.

14. A computer readable storage medium maintaining computer readable instructions which, when executed, cause one or more processors to perform acts comprising:
 accepting an input indicative of a visible change associated with an object selected in a video recording of a scene presented on a display, wherein the scene was substantially static during a time the video recording was recorded;
 responsive to the input, identifying an artifact of the object in the video recording of the substantially static scene;
 searching the video recording of the substantially static scene for an appearance change in the artifact of the object as the artifact of the object is displayed in the video recording; and
 outputting a portion of the video recording of the substantially static scene from about a time that the change associated with the artifact of the object occurred.

15. The computer readable storage medium of claim 14, the acts further comprising indexing the video recording responsive to a plurality of appearance changes in a plurality of artifacts of a plurality of objects as displayed in the video recording of the scene.

16. The computer readable storage medium of claim 14, wherein the accepting the input includes accepting a selection of the object from a group of predetermined objects in the scene, the acts further comprising generating, in the video recording of the scene presented on the display, an effect to visually distinguish the artifact of the object from other objects in the group of predetermined objects.

17. The computer readable storage medium of claim 14, wherein:
- the input further indicates the change associated with the artifact of the object; and
- the searching of the video recording further comprises searching the video recording of the substantially static scene for the indicated change associated with the artifact of the object.

18. The computer readable storage medium of claim 17, wherein the appearance change in the artifact of the object is a video recording participant moving to a new position in the scene.

19. The computer readable storage medium of claim 14, the acts further comprising, before the accepting of the input:
- identifying a plurality of artifacts corresponding to a plurality of objects in the video recording of the scene;
- searching the video recording of the substantially static scene for appearance changes in the plurality of artifacts of the objects; and
- indexing the video recording of the substantially static scene according to the appearance changes.

20. The computer readable storage medium of claim 14, the acts further comprising accepting a selection of a level of significance associated with the change associated with the artifact of the object, the searching of the video recording of the substantially static scene further comprising searching the video recording of the substantially static scene for an additional appearance change in the artifact of the object that is greater than the selected significance level.

* * * * *